United States Patent
Pan et al.

(10) Patent No.: US 9,846,756 B2
(45) Date of Patent: *Dec. 19, 2017

(54) LAYOUT METHOD FOR PRINTED CIRCUIT BOARD

(71) Applicant: MediaTek Inc, Hsin-Chu (TW)

(72) Inventors: Fu-Kang Pan, New Taipei (TW);
Nan-Cheng Chen, Hsin-Chu (TW);
Shih-Chieh Lin, Taipei (TW); Hui-Chi Tang, Hsinchu (TW); Ying Liu, Shenzhen (CN); Yang Liu, Shenzhen (CN); Ching-Chih Li, New Taipei (TW)

(73) Assignee: MEDIATEK INC, Hsin-chu (TW)

( * ) Notice: Subject to any disclaimer, the term of this patent is extended or adjusted under 35 U.S.C. 154(b) by 6 days.

This patent is subject to a terminal disclaimer.

(21) Appl. No.: 14/843,113

(22) Filed: Sep. 2, 2015

(65) Prior Publication Data

US 2015/0379180 A1    Dec. 31, 2015

Related U.S. Application Data

(63) Continuation of application No. 14/043,197, filed on Oct. 1, 2013, now Pat. No. 9,158,880, which is a
(Continued)

(51) Int. Cl.
*G06F 17/50* (2006.01)

(52) U.S. Cl.
CPC ...... *G06F 17/5072* (2013.01); *G06F 17/5068* (2013.01); *G06F 17/5077* (2013.01);
(Continued)

(58) Field of Classification Search
CPC ............ G06F 17/5077; G06F 17/5072; G06F 17/506; G06F 2217/38; G06F 2217/40; G06F 2217/128
(Continued)

(56) References Cited

U.S. PATENT DOCUMENTS 5,502,644 A    3/1996 Hamilton et al.
5,583,788 A   12/1996 Kuribayashi
(Continued)

FOREIGN PATENT DOCUMENTS

JP    2011034321    2/2011

OTHER PUBLICATIONS

Office Action dated Nov. 3, 2016, in co-pending U.S. Appl. No. 14/843,094.

*Primary Examiner* — Phallaka Kik
(74) *Attorney, Agent, or Firm* — Oblon, McClelland, Maier & Neustadt, L.L.P.

(57) ABSTRACT

A layout method for a printed circuit board (PCB) is provided. The method obtains a memory type of a dynamic random access memory (DRAM) to be mounted on the PCB, obtains a module group from a database according to the memory type of the DRAM, wherein the module group comprises a plurality of routing modules, obtains a plurality of PCB parameters, selects a specific routing module from the module group according to the PCB parameters, and implements the specific routing module into a layout design for PCB fabrication. The specific routing module comprises layout information regarding a main chip, a memory chip and a routing configuration between the main chip and the memory chip.

28 Claims, 11 Drawing Sheets

Related U.S. Application Data continuation of application No. PCT/CN2012/082884, filed on Oct. 12, 2012.

(52) U.S. Cl.
CPC ...... *G06F 2217/12* (2013.01); *G06F 2217/38* (2013.01); *G06F 2217/40* (2013.01)

(58) Field of Classification Search
USPC ....... 716/100, 137, 138, 139, 129, 130, 122, 716/123
See application file for complete search history.

(56) References Cited

U.S. PATENT DOCUMENTS

| | | | |
|---|---|---|---|
| 5,737,236 A | 4/1998 | Maziasz et al. | |
| 5,745,371 A | 4/1998 | Shouen | |
| 5,754,442 A | 5/1998 | Minagawa et al. | |
| 6,367,061 B1 | 4/2002 | Kurokawa et al. | |
| 6,529,033 B1 | 3/2003 | Park et al. | |
| 6,536,028 B1 | 3/2003 | Katsioulas et al. | |
| 6,542,393 B1 | 4/2003 | Chu et al. | |
| 6,781,363 B2 | 8/2004 | Chen | |
| 6,851,094 B1 | 2/2005 | Robertson et al. | |
| 6,864,105 B2 | 3/2005 | Grube et al. | |
| 7,051,309 B1 | 5/2006 | Crosetto | |
| 7,080,343 B2 | 7/2006 | Asai et al. | |
| 7,231,618 B2 | 6/2007 | Huang et al. | |
| 7,480,884 B1 | 1/2009 | Slonim et al. | |
| 7,702,636 B1* | 4/2010 | Sholtis ............. | G06F 17/30566 707/999.1 |
| 7,788,625 B1 | 8/2010 | Donlin et al. | |
| 8,161,451 B2 | 4/2012 | Woods | |
| 8,261,226 B1 | 9/2012 | Becker et al. | |
| 8,656,329 B1 | 2/2014 | Kukal et al. | |
| 8,676,559 B2 | 3/2014 | Sethuraman et al. | |
| 8,799,756 B2* | 8/2014 | Grosz .................. | G06F 3/1242 382/118 |
| 8,825,700 B2* | 9/2014 | Cuneo .............. | G06F 17/30398 707/778 |
| 8,930,308 B1 | 1/2015 | Johnson et al. | |
| 9,002,693 B2 | 4/2015 | Asaad et al. | |
| 9,021,052 B2 | 4/2015 | Grosz et al. | |
| 9,158,880 B2* | 10/2015 | Pan | |
| 9,326,710 B1 | 5/2016 | Liu | |
| 2002/0091836 A1 | 7/2002 | Moetteli | |
| 2002/0184606 A1 | 12/2002 | Ohba et al. | |
| 2003/0066057 A1 | 4/2003 | RuDusky | |
| 2003/0105620 A1 | 6/2003 | Bowen | |
| 2003/0141585 A1 | 7/2003 | Chang | |
| 2003/0212978 A1 | 11/2003 | Asai et al. | |
| 2003/0221172 A1 | 11/2003 | Brathwaite et al. | |
| 2004/0054716 A1 | 3/2004 | Tran et al. | |
| 2004/0089413 A1 | 5/2004 | Murphy et al. | |
| 2005/0071787 A1 | 3/2005 | Koga et al. | |
| 2005/0235239 A1 | 10/2005 | Matsubara | |
| 2005/0240883 A1 | 10/2005 | Huang et al. | |
| 2006/0093129 A1 | 5/2006 | Redorta | |
| 2006/0095882 A1 | 5/2006 | Mankin et al. | |
| 2006/0101368 A1 | 5/2006 | Kesarwani et al. | |
| 2006/0259891 A1 | 11/2006 | Ting | |
| 2007/0057362 A1 | 3/2007 | Brown | |
| 2007/0118829 A1 | 5/2007 | Wang et al. | |
| 2007/0294656 A1 | 12/2007 | Bowen | |
| 2008/0111535 A1 | 5/2008 | Su | |
| 2008/0288908 A1 | 11/2008 | Hart et al. | |
| 2009/0019403 A1 | 1/2009 | Iwaki | |
| 2009/0119628 A1 | 5/2009 | Lottmann | |
| 2010/0064267 A1 | 3/2010 | Tanaka | |
| 2010/0090722 A1 | 4/2010 | Kao | |
| 2010/0148329 A1 | 6/2010 | Golick et al. | |
| 2010/0244238 A1 | 9/2010 | Yoshikawa et al. | |
| 2011/0113394 A1 | 5/2011 | Woods | |
| 2011/0320848 A1 | 12/2011 | Perry et al. | |
| 2012/0036491 A1 | 2/2012 | Ramji et al. | |
| 2012/0140423 A1 | 6/2012 | Fisher, Jr. | |
| 2013/0167103 A1 | 6/2013 | Burrell | |
| 2013/0283398 A1 | 10/2013 | Wu | |
| 2014/0012922 A1 | 1/2014 | Wu | |
| 2014/0068543 A1 | 3/2014 | Yuan et al. | |
| 2014/0249797 A1* | 9/2014 | Liu ................... | G06F 17/2288 704/2 |
| 2014/0326495 A1 | 11/2014 | Paniagua | |

\* cited by examiner

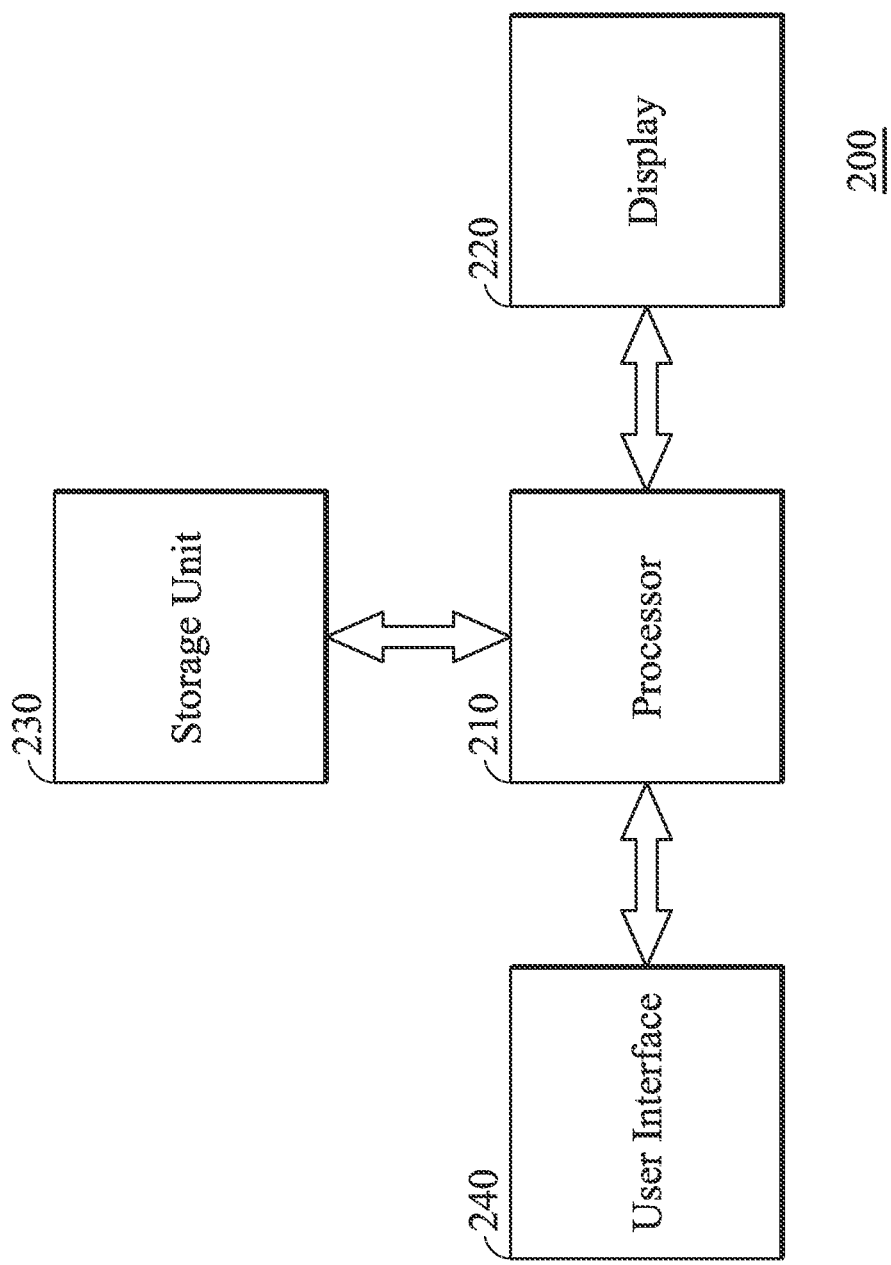

| Module Group | PCB specification ||| Component placement | Routing module |
|---|---|---|---|---|---|
| | Layer | Stack-up | Via Type | | |
| LPDDR2 +eMMC | 8L | HDI+1 | 1+6+1 | Single-sided | MMD_S1 |
| | 8L | HDI+1 | 1+6+1 | Double-sided | MMD_S2 |
| | 8L | HDI+2 | 1+1+4+1+1(stagger via) | Single-sided | MMD_S3 |
| | 8L | HDI+2 | 1+1+4+1+1(stagger via) | Double-sided | MMD_S4 |
| | 8L | HDI+2 | 1+1+4+1+1(stacked via) | Single-sided | MMD_S5 |
| | 8L | HDI+2 | 1+1+4+1+1(stacked via) | Double-sided | MMD_S6 |
| | 10L | HDI+1 | 1+6+1 | Single-sided | MMD_D1 |
| | 10L | HDI+1 | 1+6+1 | Double-sided | MMD_D2 |
| | 10L | HDI+2 | 1+1+4+1+1(stagger via) | Single-sided | MMD_D3 |
| | 10L | HDI+2 | 1+1+4+1+1(stagger via) | Double-sided | MMD_D4 |
| | 10L | HDI+2 | 1+1+4+1+1(stacked via) | Single-sided | MMD_D5 |
| | 10L | HDI+2 | 1+1+4+1+1(stacked via) | Double-sided | MMD_D6 |

FIG. 3C

LAYOUT METHOD FOR PRINTED CIRCUIT BOARD

CROSS REFERENCE TO RELATED APPLICATIONS

This application is a Continuation of pending U.S. patent application Ser. No. 14/043,197, filed on Oct. 1, 2013 and entitled "LAYOUT METHOD FOR PRINTED CIRCUIT BOARD", which claims the benefit of China Patent Application No. PCT/CN2012/082884, filed on Oct. 12, 2012, the entirety of which is incorporated by reference herein.

BACKGROUND OF THE INVENTION

Field of the Invention

The invention relates to a layout method for a printed circuit board (PCB), and more particularly, to a layout method of an embedded multi-chip package (eMCP) for a PCB.

Description of the Related Art

Recently, electrical products tend to have higher efficiencies and be smaller. Therefore, sizes of printed circuit boards (PCB) and chips mounted on the PCBs are continuing to be miniaturized, while frequencies of electronic signals transmitted on the PCBs are being increased.

A PCB layout diagram file (design) is created based on a circuit schematic diagram, and includes a plurality of layout modules. When designing a PCB using layout software (e.g. an electronic design automation (EDA) tool), signal performances of the components should be considered. For example, time is needed to arrange the placement of a memory and other related chips and the traces of high speed buses between the memory and the chips for a product manufacturer.

BRIEF SUMMARY OF THE INVENTION

Layout methods for a printed circuit board (PCB) are provided. An embodiment of a layout method for a PCB is provided. A memory type of a dynamic random access memory (DRAM) to be mounted on the PCB is obtained. A module group is obtained from a database according to the memory type of the DRAM, wherein the module group comprises a plurality of routing modules. A plurality of PCB parameters are obtained. A specific routing module is selected from the module group according to the PCB parameters. The specific routing module is implemented into a layout design of the PCB. The specific routing module comprises layout information regarding a main chip, a memory chip and a routing configuration between the main chip and the memory chip.

Furthermore, another embodiment of a layout method for a PCB is provided. Electronic design automation (EDA) information regarding a PCB EDA tool is obtained. A memory type of a dynamic random access memory (DRAM) to be mounted on the PCB is obtained. A module group is obtained from a database according to the memory type of the DRAM and the EDA information, wherein the module group comprises a plurality of routing modules. A plurality of PCB parameters are obtained. A specific routing module is selected from the module group according to the PCB parameters. The specific routing module is implemented into a layout design of the PCB provided by the PCB EDA tool. The specific routing module comprises layout information regarding a main chip, a memory chip and a routing configuration between the main chip and the memory chip.

Moreover, another embodiment of a layout method for a PCB is provided, wherein the layout method is performed by a server. A project ID corresponding to the PCB from a client is obtained. The project ID is recognized to determine whether the project ID exists in an account list. At least one module group from a database of a server is obtained according to the project ID when the project ID does not exist in the account list, wherein the module group comprises a plurality of routing modules. A plurality of PCB parameters are obtained. At least one specific routing module is selected from the module group according to the PCB parameters. The specific routing module is provided to the client. The project ID is added into the account list. The specific routing module comprises layout information regarding a main chip, a memory chip and a routing configuration between the main chip and the memory chip. The client implements the specific routing module into a layout design of the PCB.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 2 shows a circuit design simulation system for a printed circuit board according to an embodiment of the invention;

FIG. 3C shows a table illustrating a module group of a specific eMCP chip (e.g. LPDDR2+eMMC);

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
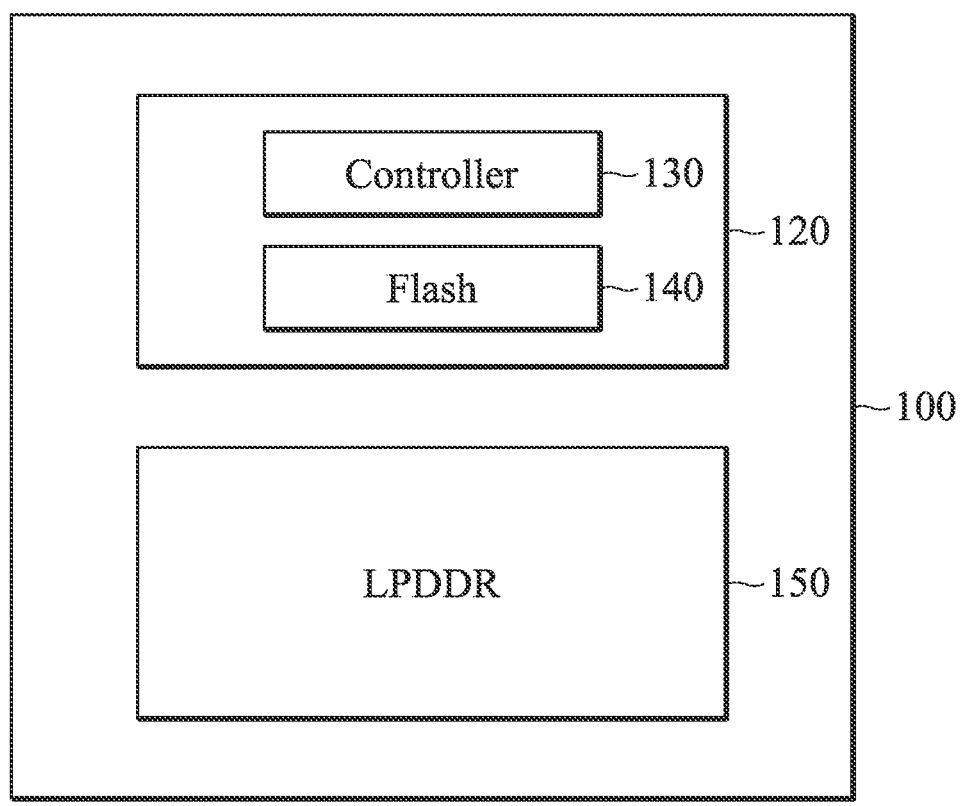
FIG. 1 shows a schematic illustrating an embedded multi-chip package (eMCP)

FIG. 1 shows a schematic illustrating an embedded multi-chip package (eMCP) 100. In general, eMCP is a kind of package type for mobile memory which integrates a mobile DRAM and a flash memory into one chip. In FIG. 1, the eMCP 100 comprises an Embedded MultiMediaCard (eMMC) 120 and a mobile DDR 150. The eMMC 120 conforms to a flash memory card standard, which describes an architecture consisting of an embedded storage solution with a controller 130 and a flash memory 140. Furthermore, the controller 130 and the flash memory 140 are integrated in a ball grid array (BGA) package. Moreover, Mobile DDR 150 (also known as Low Power DDR (LPDDR)) is a type of double data rate (DDR) synchronous DRAM for mobile computers. Using the eMCP 100 helps to save a lot of hardware space, thus allowing mobile devices (e.g. a smart phone) to be thinner and casings to be enclosed more properly. The major defect of an eMCP is the design issues of high-speed memory buses on PCBs.

FIG. 2 shows a circuit design simulation system 200 for a printed circuit board according to an embodiment of the invention. The circuit design simulation system 200 comprises a processor 210, a display 220, a storage unit 230 and a user interface 240. The display 220, the storage unit 230 and the user interface 240 are coupled to the processor 210. The user interface 240 is used to receive layout information or settings (e.g. layout parameters, net-lists and so on) provided by a designer. The storage unit 230 comprises a database for storing a plurality of layout modules. The processor 210 is used to perform a PCB electronic design automation (EDA) tool, which obtains the layout information or settings from the user interface 240 and performs a PCB circuit layout design according to the layout modules from the storage unit 230, so as to display a layout design on the display 220. In one embodiment, the storage unit 230 is disposed in a server.

Figure 3A:
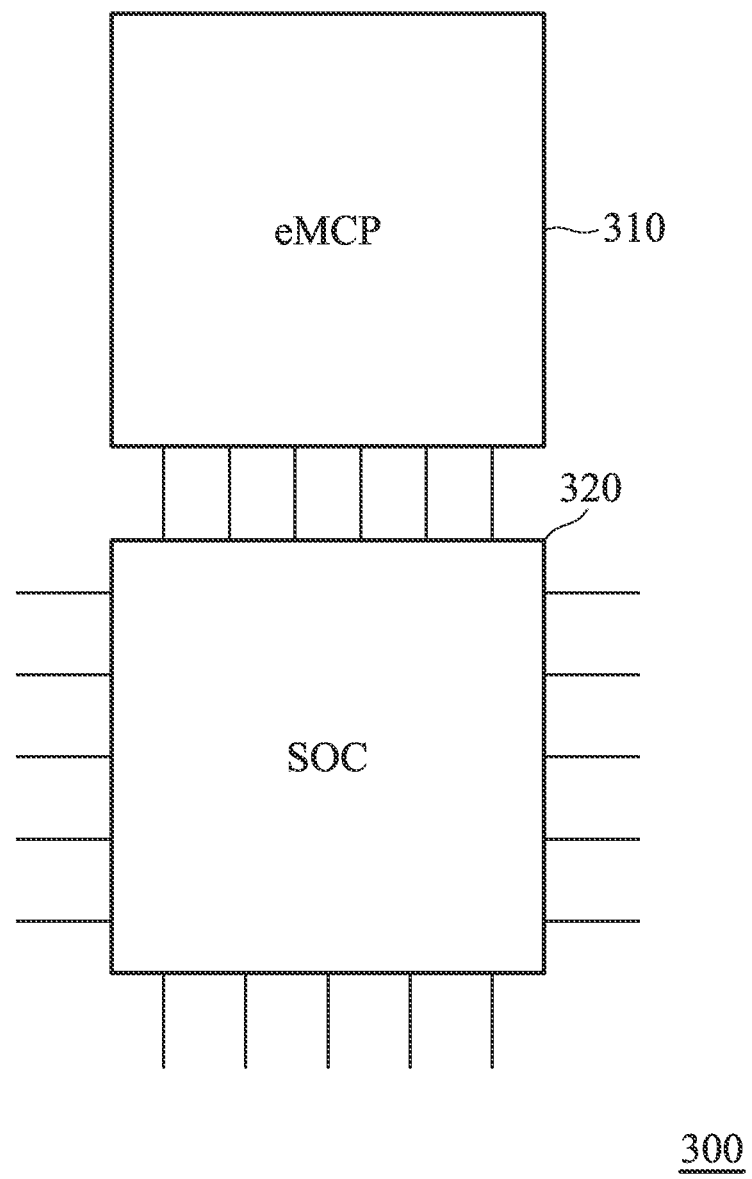
FIG. 3A shows a schematic illustrating a layout module for a PCB according to an embodiment of the invention.

FIG. 3A shows a schematic illustrating a layout module 300 for a PCB according to an embodiment of the invention. The layout module 300 comprises a memory chip 310 and a main chip 320, wherein the memory chip 310 is an eMCP package and the main chip 320 is a system on chip (SOC) chip. By designing the PCB routing between the chips 310 and 320 to be a routing module in advance, the design of high-speed memory buses is simplified for the PCB, whereby it is easy to mount or repair the components of the PCB and costs and design times are decreased for a product manufacturer.

Figure 3B:
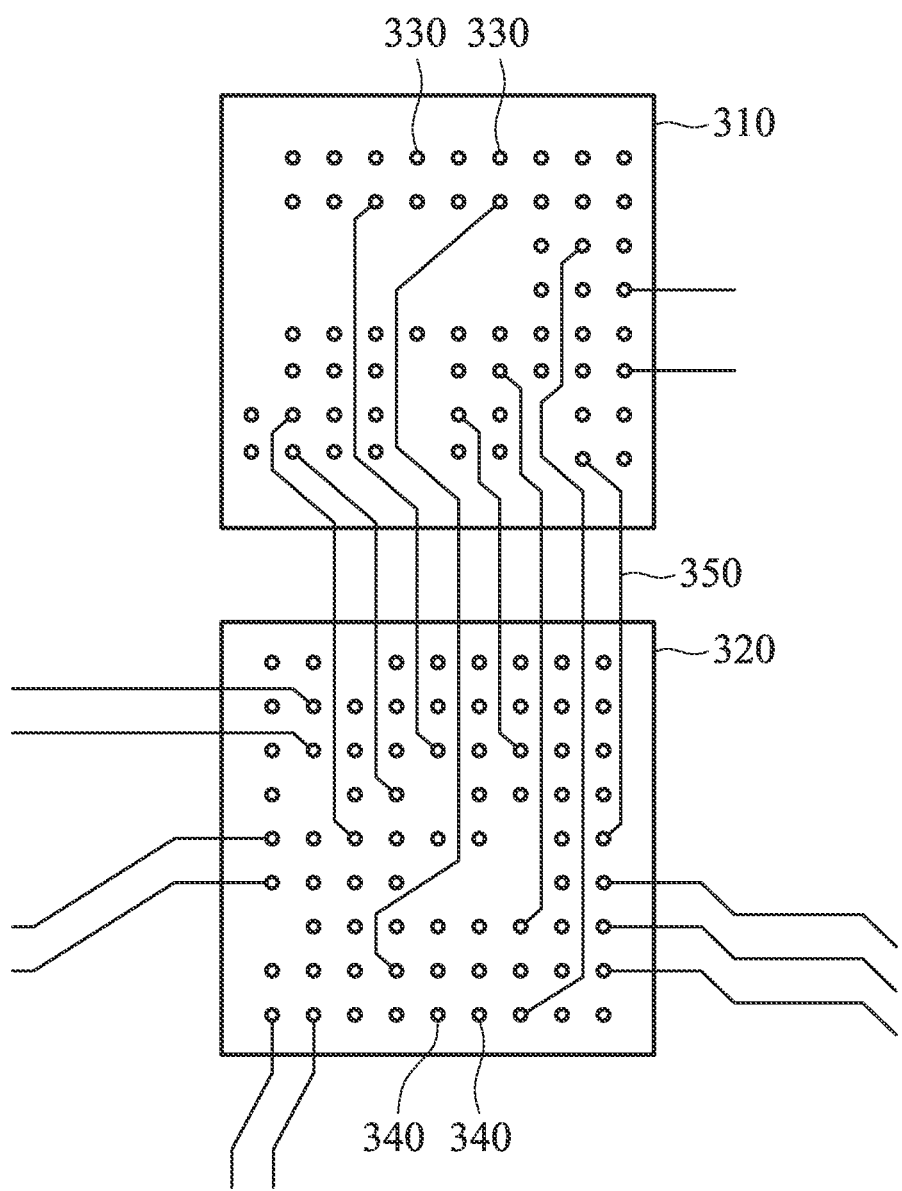
FIG. 3B shows an example illustrating a routing configuration of the layout module of FIG. 3A.

FIG. 3B shows an example illustrating a routing configuration of the layout module 300 of FIG. 3A. In FIG. 3B, the chips 310 and 320 are BGA packages. In FIG. 3B, only a portion of the pads/vias 330, a portion of the pads/vias 340 and a portion of the traces 350 are displayed to simplify description, wherein the pads/vias 330 are designed for the pins of the chip 310, the pads/vias 340 are designed for the pins of the chip 320, and the traces 350 are designed for interconnection between the chips 310 and 320. According to various PCB standard parameters (e.g. layers, stack-up and via type, etc.), a plurality of routing modules can be provided for the same eMCP chip 310 and the same SOC chip 320. FIG. 3C shows a table illustrating a module group of a specific eMCP chip (e.g. LPDDR2+eMMC). In the table of FIG. 3C, the module group comprises 12 routing modules MMD_S1-MMD_S6 and MMD_D1-MMD_D6 for the chips 310 and 320. Furthermore, the PCB standard parameters comprise a layer count (e.g. 8 or 10 Layers), a stack-up setting (e.g. high density interconnect (HDI)+1 or HDI+2) and a via type (stagger via or stacked via). For example, the routing modules MMD_S1-MMD_S6 are provided for 8-layer PCBs, and the routing modules MMD_D1-MMD_D6 are provided for 10-layer PCBs. Moreover, a component placement parameter indicates that the components can be mounted on a single-sided or double-sided PCB.

Figure 4:
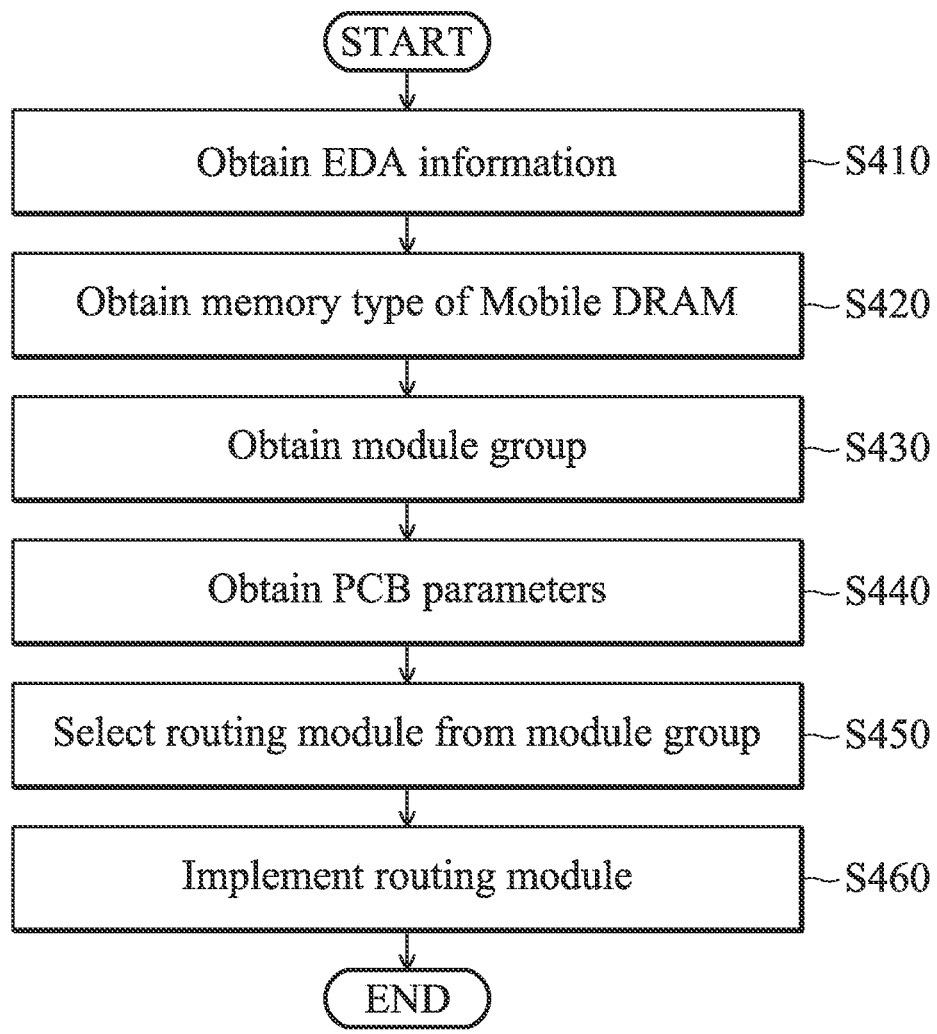
FIG. 4 shows a layout method for a PCB according to an embodiment of the invention, wherein the layout method is performed by the circuit design simulation system of FIG. 2.
Figure 5:
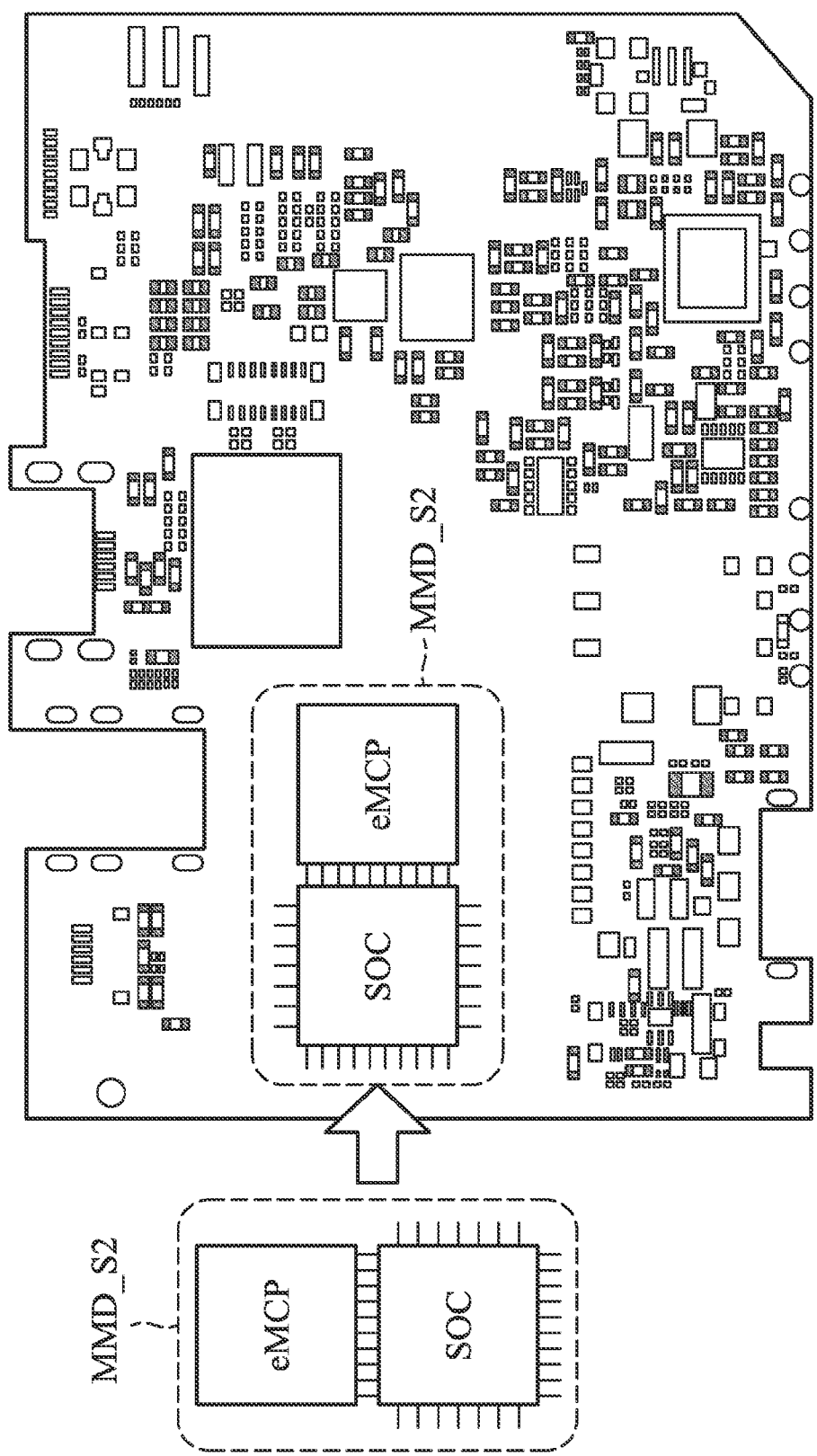
FIG. 5 shows a schematic illustrating a layout design according to an embodiment of the invention.

FIG. 4 shows a layout method for a PCB according to an embodiment of the invention, wherein the layout method is performed by the circuit design simulation system of FIG. 2. Referring to FIG. 2 and FIG. 4 together, in step S410, electronic design automation (EDA) information regarding a PCB EDA tool is obtained by the processor 210. Next, in step S420, a memory type of a mobile DRAM is obtained by the processor 210, wherein an eMCP chip comprising the mobile DRAM is to be mounted on the PCB. In one embodiment, the memory type of the mobile DRAM is input by a user via the user interface 240. In another embodiment, the memory type of the mobile DRAM is obtained according to a net-list of the PCB from the user interface 240 or the storage unit 230. Next, in step S430, the processor 210 transmits a requirement corresponding to the memory type of the mobile DRAM and the EDA information to the storage unit 230, so as to obtain a module group from the database of the storage unit 230, wherein the module group comprises a plurality of routing modules corresponding to the memory type of the mobile DRAM. Next, in step S440, a plurality of PCB parameters are obtained by the processor 210, wherein the PCB parameters comprises a layer count, a stack-up setting, a via type and component placement information of the PCB. In one embodiment, the PCB parameters are input by a user via the user interface 240. In another embodiment, the PCB parameters are obtained according to a net-list of the PCB from the user interface 240 or the storage unit 230. Next, in step S450, a suitable routing module is selected from the module group according to the PCB parameters. For example, if the layer count is "8", the stack-up setting is "HDI+1", the via type is "1+6+1" and the component placement is "double-sided". The processor 210 may select the routing module MMD_S2 from the table of FIG. 2 as the suitable routing module. Next, in step S460, the suitable routing module is implemented into a layout design displayed in the display via the PCB EDA tool, as shown in FIG. 5. In one embodiment, the suitable routing module is fully implemented in the layout design. In another embodiment, the suitable routing module is partially implemented in the layout design. For example, the placement of an eMCP chip, a SOC chip and peripheral components (e.g. bypass capacitors) are copied to the layout design. Next, the traces, the vias and the power/ground planes are copied to the layout design, and then the traces, the vias and the power/ground planes are modified by a user via the user interface 240. Specifically, the eMCP chip and the main chip are completely implemented in the layout design, and the routing configuration is partially implemented in the layout design.

Figure 6A:
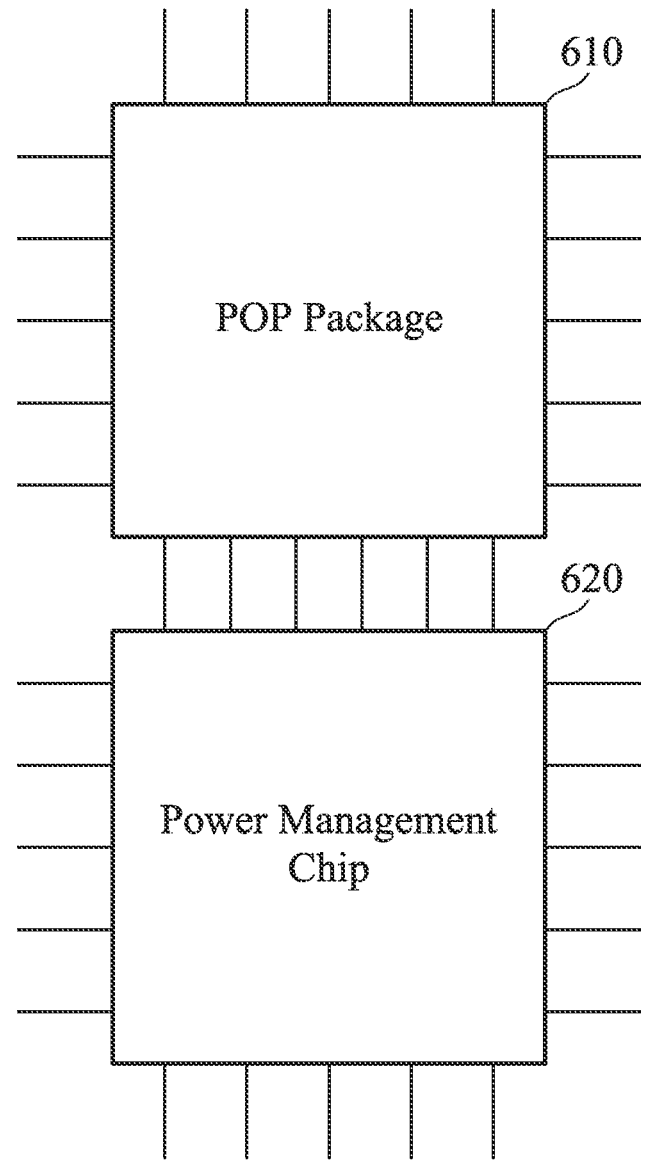
FIG. 6A shows a schematic illustrating a layout module for a PCB according to another embodiment of the invention.

FIG. 6A shows a schematic illustrating a layout module 600 for a PCB according to another embodiment of the invention. The layout module 600 comprises a package-on-package (POP) package 610 and a power management chip 620. The POP package 610 comprises at least two chips, wherein one of the chips is a main chip and the other chip is a memory chip. In the embodiment, the memory chip is a DRAM. Furthermore, the power management chip 620 is used to provide various voltages to the POP package 610 and other devices on the PCB. In the embodiment, no DRAM is mounted on the PCB because the DRAM has been integrated into the POP type package, thereby decreasing design complexity. Furthermore, by designing the PCB routing between the POP package 610 and the power management chip 620 to be a routing module according to power delivery network (PDN) on the PCB in advance, the design of power arrangement is simplified for the PCB. As described above, according to various PCB standard parameters (e.g. layers, stack-up and via type, etc.) and the type of the memory chip of the POP package 610, a plurality of routing modules can be provided for the POP package 610 and the power management chip 620. Similarly, according to various power requirements, a table illustrating a module group of a specific power management chip can also be established.

Figure 6B:
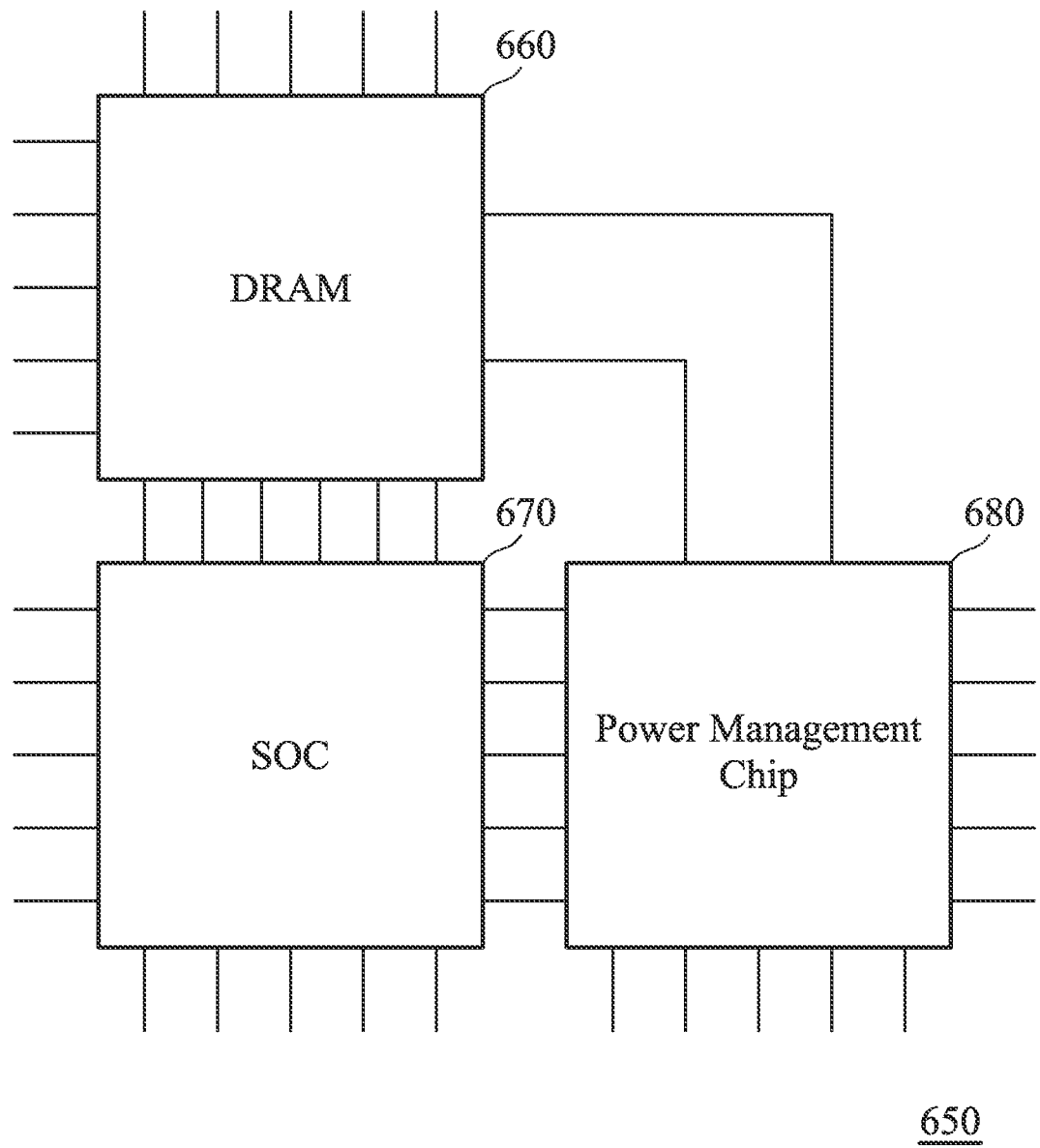
FIG. 6B shows a schematic illustrating a layout module for a PCB according to another embodiment of the invention.

Furthermore, the amount of the chips of a layout module can be more than two. FIG. 6B shows a schematic illustrating a layout module 650 for a PCB according to another embodiment of the invention. The layout module 650 comprises a memory chip 660, a main chip 670 and a power management chip 680, wherein the memory chip 660 is a DARM chip and the main chip 670 is a SOC chip. In the embodiment, by designing the PCB routing between the memory chip 660, the main chip 670 and the power management chip 680 to be a routing module in advance, the design of power arrangement and high-speed memory buses is simplified for the PCB, whereby it is easy to mount or repair the components of the PCB and costs and design times are decreased for a product manufacturer. As described above, according to various PCB standard parameters (e.g. layers, stack-up and via type, etc.) and the type of memory chip 660, a plurality of routing modules can be provided for the memory chip 660, the main chip 670 and the power management chip 680. Furthermore, the placement of the memory chip 660, the main chip 670 and the power management chip 680 is determined according to the memory type of the memory chip 660 and the PDN of the PCB. Specifically, the PCB routing between the large and complex chips can be designed to be a routing module in advance, so as to simplify the PCB design.

Figure 7:
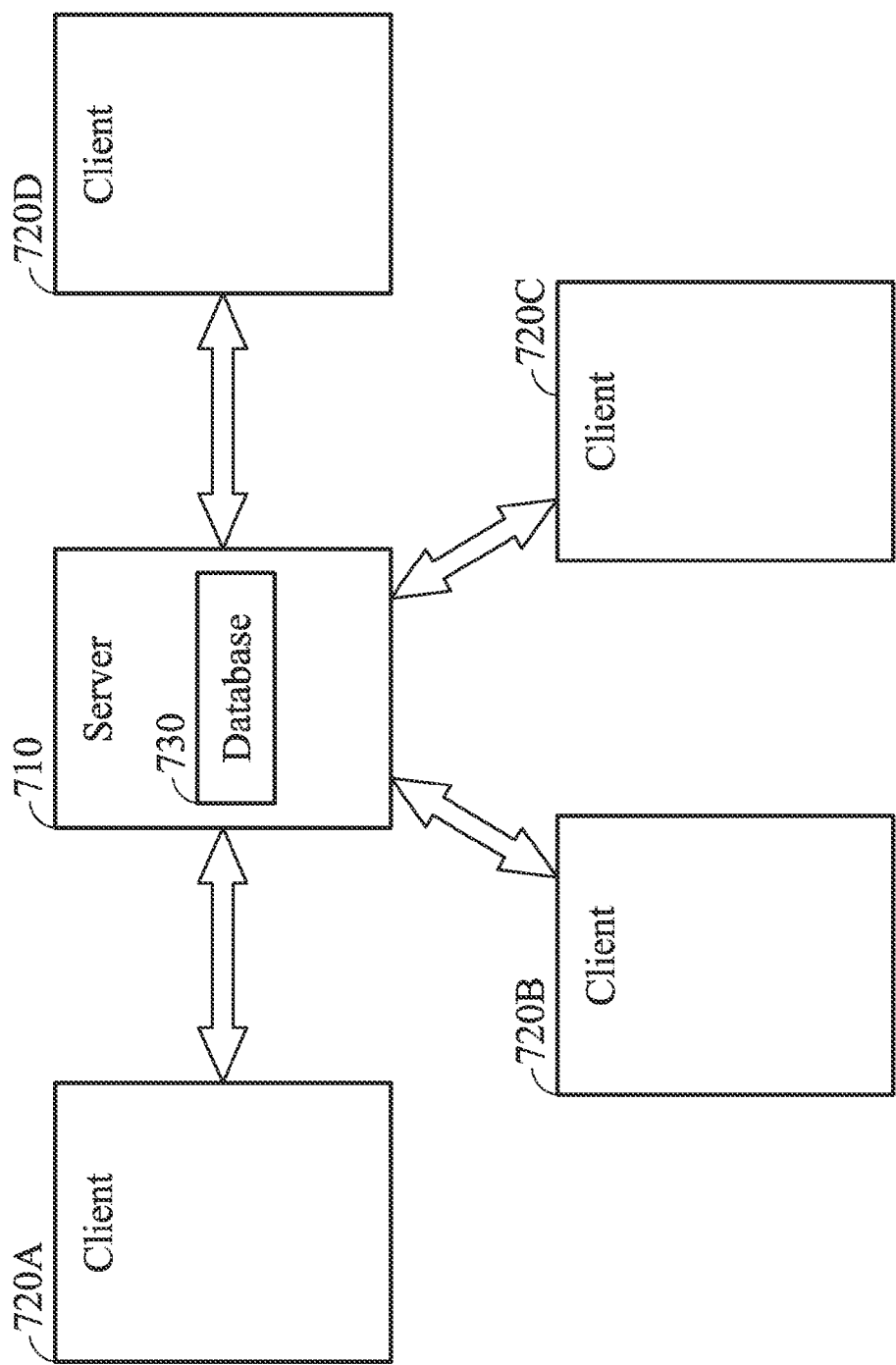
FIG. 7 shows a layout server and a plurality of clients according to an embodiment of the invention.

FIG. 7 shows a layout server 710 and a plurality of clients 720A-720D according to an embodiment of the invention. The layout server 710 comprises at least one database 730 for storing a plurality of layout groups. Furthermore, the database 730 further comprises a look up table which records the relationships between the module groups and various PCB projects. Each of the clients 720A-720D may comprises a processor (e.g. the processor 210 of FIG. 2), a display (e.g. the display 220 of FIG. 2) and the user interface (e.g. the user interface 240 of FIG. 2). In one embodiment, each of the clients 720A-720D may be the circuit design simulation system 200 of FIG. 2. The user interface is used to receive layout information or settings (e.g. layout parameters, net-lists and so on) provided by a designer. The processor is used to perform a PCB electronic design automation (EDA) tool, which obtains the layout information or settings from the user interface and performs a PCB circuit layout design according to the layout modules from the layout server 710, so as to display a layout design on the display. If FIG. 7, the layout modules stored in the database of the layout server 710 can be accessed by the clients 720A-720D, respectively. As described above, according to various PCB standard parameters (e.g. layers, stack-up and via type, etc.) and the types of a memory chip, a plurality of routing modules can be provided. Similarly, according to various power requirements, a table illustrating a module group of a specific power management chip can also be established. Furthermore, a user of the client can find the suitable routing modules by checking required parameters on the look up table.

Figure 8:
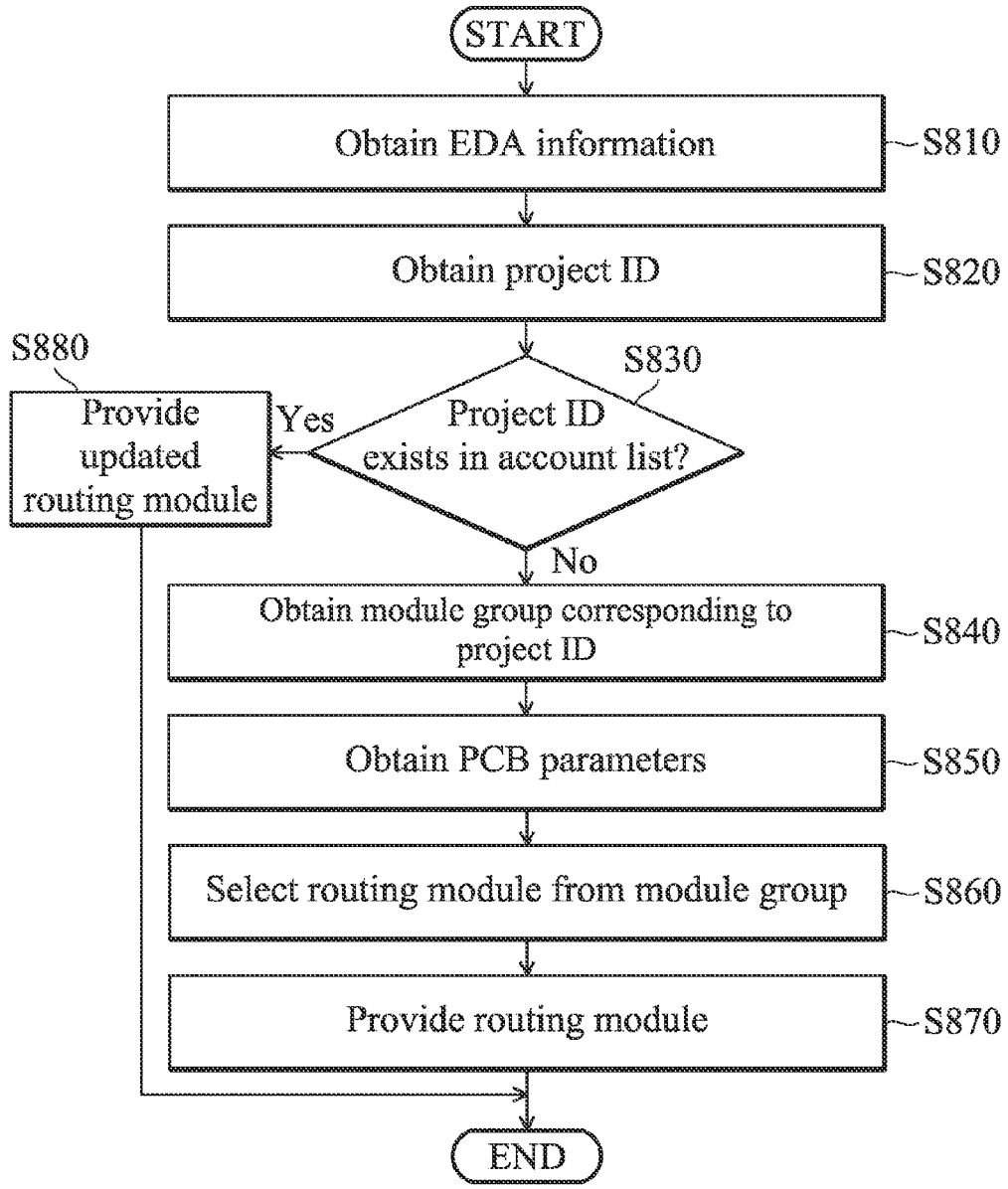
FIG. 8 shows a layout method for a PCB according to another embodiment of the invention, wherein the layout method is performed by the layout server of FIG. 7.

FIG. 8 shows a layout method for a PCB according to another embodiment of the invention, wherein the layout method is performed by the layout server 710 of FIG. 7.

Referring to FIG. 7 and FIG. 8 together, in step S810, electronic design automation (EDA) information regarding a PCB EDA tool is obtained by the layout server 710, wherein the EDA information is provided by one of the clients 720A-720D. Next, in step S820, the layout server 710 obtains a project ID from the client. Next, in step S830, the layout server 710 recognizes the project ID to determine whether the project ID exists in an account list, wherein the account list is stored in the database 730 and records the information regarding the project IDs that have logged in successfully. If the project ID does not exist in the account list, the layout server 710 obtains the required module groups from the database 730 according to the EDA information, the project ID and the look up table of the database 730 (step S840), wherein each required module group comprises a plurality of routing modules corresponding to the project ID. Furthermore, the look up table can be modified by the client. In one embodiment, the look up table is provided by the client. Next, in step S850, a plurality of PCB parameters are obtained by the layout server 710, wherein the PCB parameters comprises a layer count, a stack-up setting, a via type and component placement information of the PCB. In the embodiment, the PCB parameters are stored in the database 730, and the PCB parameters can be modified by the client. In one embodiment, the PCB parameters are input by a user via the client. In another embodiment, the PCB parameters are obtained according to a net-list of the PCB from the client or the database 730. Next, in step S860, the suitable routing modules are selected from the module groups according to the PCB parameters. Next, in step S870, the layout server 710 provides the suitable routing modules to the client (i.e. the suitable routing modules are downloaded to the client), so as to implement the suitable routing modules to a layout design via the PCB EDA tool. Simultaneously, the layout server 710 adds the project ID into the account list. As described above, the client can fully or partially implements the suitable routing modules into the layout design of the PCB. Referring back to step S830, if the project ID exists in the account list, the layout server 710 will determine whether the suitable routing modules corresponding to the project ID have been updated in the database 730. If yes, the layout server 710 provides the updated version of the routing modules to the client (step S880). Thus, the layout design can be updated.

Furthermore, the module groups and the look up table, and the PCB parameters can be stored in a storage media, such as a Flash memory device or an optical disc. Thus, the storage media can be delivered to various users. The routing modules of the module groups are compatible with the user's PCB EDA tool, thereby the users can easily copy and use the routing modules on various PCB layout design.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A layout method for a printed circuit board (PCB), comprising:

obtaining a memory type of a dynamic random access memory (DRAM) to be mounted on the PCB;

obtaining a module group from a database according to the memory type of the DRAM, wherein the module group comprises a plurality of routing modules;
obtaining a plurality of PCB parameters;
selecting a specific routing module from the module group according to the PCB parameters;
implementing the specific routing module into a layout design for PCB fabrication,
wherein the specific routing module comprises layout information regarding a main chip, a memory chip and a routing configuration between the main chip and the memory chip;
generating a PCB layout based at least on the layout information and the routing configuration; and
generating at least one physical mask based at least in part on the PCB layout for use in PCB fabrication.

2. The layout method as claimed in claim 1, wherein the DRAM is a mobile memory, and the DRAM and a flash memory are packaged in the memory chip.

3. The layout method as claimed in claim 1, wherein the main chip is a system on chip (SOC) chip.

4. The layout method as claimed in claim 1, wherein the step of obtaining the module group from the database according to the memory type of the DRAM further comprises:
transmitting a requirement corresponding to the memory type of the DRAM, to the database; and
receiving the routing modules corresponding to the memory type of the DRAM from the database,
wherein the database is disposed in a server, and the server provides the routing modules in response to the requirement.

5. The layout method as claimed in claim 4, wherein the requirement comprises information regarding a PCB electronic design automation (EDA) tool.

6. The layout method as claimed in claim 1, wherein the PCB parameters comprises a layer count, a stack-up setting, a via type and component placement information of the PCB.

7. The layout method as claimed in claim 6, wherein the via type of the PCB represents whether a plurality of vias of the PCB are stagger vias or stacked vias.

8. The layout method as claimed in claim 6, wherein the component placement information represents whether the PCB is a single-sided PCB or a double-sided PCB.

9. The layout method as claimed in claim 1, wherein the step of implementing the specific routing module into the layout design of the PCB further comprises:
fully implementing the specific routing module into the layout design of the PCB, so as to completely implement the main chip, the memory chip and the routing configuration into the layout design of the PCB; or
partially implementing the specific routing module into the layout design of the PCB, so as to completely implement the main chip and the memory chip and partially implement the routing configuration into the layout design of the PCB.

10. A layout method for a printed circuit board (PCB), comprising:
obtaining electronic design automation (EDA) information regarding a PCB EDA tool;
obtaining a memory type of a dynamic random access memory (DRAM) to be mounted on the PCB;
obtaining a module group from a database according to the memory type of the DRAM and the EDA information, wherein the module group comprises a plurality of routing modules;
obtaining a plurality of PCB parameters;
selecting a specific routing module from the module group according to the PCB parameters;
implementing the specific routing module into a layout design for PCB fabrication provided by the PCB EDA tool,
wherein the specific routing module comprises layout information regarding a main chip, a memory chip and a routing configuration between the main chip and the memory chip;
generating a PCB layout based at least on the layout information and the routing configuration; and
generating at least one physical mask based at least in part on the PCB layout for use in PCB fabrication.

11. The layout method as claimed in claim 10, wherein the DRAM is a mobile memory, and the DRAM and a flash memory are packaged in the memory chip.

12. The layout method as claimed in claim 10, wherein the main chip is a system on chip (SOC) chip.

13. The layout method as claimed in claim 10, wherein the step of obtaining the module group from the database according to the memory type of the DRAM and the EDA information further comprises:
transmitting a requirement corresponding to the memory type of the DRAM and the EDA information, to the database; and
receiving the routing modules corresponding to the memory type of the DRAM from the database,
wherein the database is disposed in a server, and the server provides the routing modules in response to the requirement.

14. The layout method as claimed in claim 10, wherein the PCB parameters comprises a layer count, a stack-up setting, a via type and component placement information of the PCB.

15. The layout method as claimed in claim 14, wherein the via type of the PCB represents whether a plurality of vias of the PCB are stagger vias or stacked vias.

16. The layout method as claimed in claim 14, wherein the component placement information represents whether the PCB is a single-sided PCB or a double-sided PCB.

17. The layout method as claimed in claim 10, wherein the step of implementing the specific routing module into the layout design of the PCB further comprises:
fully implementing the specific routing module into the layout design of the PCB, so as to completely implement the main chip, the memory chip and the routing configuration into the layout design of the PCB; or
partially implementing the specific routing module into the layout design of the PCB, so as to completely implement the main chip and the memory chip and partially implement the routing configuration into the layout design of the PCB.

18. A layout method for a printed circuit board (PCB), comprising:
obtaining a project ID corresponding to the PCB from a client;
recognizing the project ID to determine whether the project ID exists in an account list;
obtaining at least one module group from a database of a server according to the project ID when the project ID does not exist in the account list, wherein the module group comprises a plurality of routing modules;
obtaining a plurality of PCB parameters;
selecting at least one specific routing module from the module group according to the PCB parameters;

providing the specific routing module to the client and adding the project ID into the account list, wherein the specific routing module comprises layout information regarding a main chip, a memory chip and a routing configuration between the main chip and the memory chip, wherein the client implements the specific routing module into a layout design for PCB fabrication;

generating a PCB layout based at least on the layout information and the routing configuration; and generating at least one physical mask based at least in part on the PCB layout for use in PCB fabrication.

19. The layout method as claimed in claim 18, wherein the DRAM is a mobile memory, and the DRAM and a flash memory are packaged in the memory chip.

20. The layout method as claimed in claim 18, wherein the main chip is a system on chip (SOC) chip.

21. The layout method as claimed in claim 18, further comprising:

obtaining PCB information regarding a PCB electronic design automation (EDA) tool, wherein the module group is obtained according to the project ID and the PCB information.

22. The layout method as claimed in claim 18, wherein the PCB parameters is provided by the database or the client.

23. The layout method as claimed in claim 18, wherein the PCB parameters comprises a layer count, a stack-up setting, a via type and component placement information of the PCB.

24. The layout method as claimed in claim 23, wherein the via type of the PCB represents whether a plurality of vias of the PCB are stagger vias or stacked vias.

25. The layout method as claimed in claim 23, wherein the component placement information represents whether the PCB is a single-sided PCB or a double-sided PCB.

26. The layout method as claimed in claim 18, wherein the client fully implements the specific routing module into the layout design of the PCB, so as to completely implement the main chip, the memory chip and the routing configuration into the layout design of the PCB.

27. The layout method as claimed in claim 18, wherein the client partially implements the specific routing module into the layout design of the PCB, so as to completely implement the main chip and the memory chip and partially implement the routing configuration into the layout design of the PCB.

28. The layout method as claimed in claim 18, further comprising:

determining whether the specific routing module has been updated in the database; and providing the updated specific routing module to the client.

* * * * *